United States Patent [19]

Sargent

[11] Patent Number: 5,321,506

[45] Date of Patent: Jun. 14, 1994

[54] AUTOMATIC SCREW-ON PIPE COUPLINGS

[75] Inventor: William B. Sargent, Birmingham, Ala.

[73] Assignee: USX Corporation, Pittsburgh, Pa.

[21] Appl. No.: 715,935

[22] Filed: Jun. 14, 1991

[51] Int. Cl.$^5$ .............................................. H04N 7/18
[52] U.S. Cl. .................................. 348/95; 73/862.23; 29/407; 29/240
[58] Field of Search ................. 358/101, 107, 106; 29/240, 407, 720, 721; 73/862.23; 364/508

[56] References Cited

U.S. PATENT DOCUMENTS

| | | | |
|---|---|---|---|
| 2,639,497 | 5/1953 | Stouffer | 29/240 |
| 2,984,000 | 5/1961 | McConnell | 29/240 |
| 3,039,181 | 6/1962 | Sawdey | 29/240 |
| 3,298,089 | 1/1967 | Long et al. | 29/240 |
| 3,939,920 | 2/1976 | Hardiman et al. | 173/1 |
| 4,091,451 | 5/1978 | Weiner et al. | 364/506 |
| 4,127,927 | 12/1978 | Hauk et al. | 29/407 |
| 4,176,436 | 12/1979 | McCombs et al. | 29/240 |
| 4,208,918 | 6/1980 | Miyamae | 73/708 |
| 4,210,017 | 7/1980 | Motsinger | 73/139 |
| 4,365,402 | 12/1982 | McCombs et al. | 29/407 |
| 4,375,120 | 3/1983 | Sigmund | 29/407 |
| 4,375,121 | 3/1983 | Sigmund | 29/407 |
| 4,375,122 | 3/1983 | Sigmund | 29/407 |
| 4,375,123 | 3/1983 | Ney | 29/407 |
| 4,400,785 | 8/1983 | Wallace et al. | 364/508 |
| 4,402,052 | 8/1983 | Stone et al. | 364/506 |
| 4,426,887 | 1/1984 | Reinholm et al. | 73/862.23 |
| 4,444,273 | 4/1984 | Ruby | 173/12 |
| 4,450,727 | 5/1984 | Reinholm et al. | 73/862.23 |
| 4,520,446 | 5/1985 | Sato | 364/468 |
| 4,522,075 | 6/1985 | Pohl | 73/862.23 |
| 4,558,601 | 12/1985 | Stasiek et al. | 73/862.23 |
| 4,592,125 | 6/1986 | Skene | 29/407 |
| 4,620,450 | 11/1986 | Yamaguchi | 73/862.23 |
| 4,643,030 | 2/1987 | Becker et al. | 73/862.63 |
| 4,644,394 | 2/1987 | Reeves | 358/101 |
| 4,669,319 | 6/1987 | Heyraud | 73/962.23 |
| 4,711,006 | 12/1987 | Baldenko et al. | 29/720 X |
| 4,715,211 | 12/1987 | Lehoczky | 73/1 C |
| 4,730,254 | 3/1988 | Voden, Jr. | 364/422 |
| 4,738,145 | 4/1988 | Vincent et al. | 73/862.23 |
| 4,785,520 | 11/1988 | Bourdonne et al. | 29/407 |
| 4,791,839 | 12/1988 | Bickford et al. | 81/479 |
| 4,823,616 | 4/1989 | Tambini | 73/862.23 |
| 4,829,650 | 5/1989 | Galard | 29/407 |
| 4,906,980 | 3/1990 | Fukuhara | 340/680 |
| 4,942,660 | 7/1990 | Bourdonne et al. | 29/701 |
| 4,962,579 | 10/1990 | Moyer et al. | 29/407 |
| 4,969,105 | 11/1990 | Gaennsle | 73/862.23 X |
| 4,982,612 | 1/1991 | Rittmann | 73/862.23 |
| 4,987,806 | 1/1991 | Lehnert | 81/469 |
| 5,007,153 | 4/1991 | Junkers | 29/407 |

OTHER PUBLICATIONS

"Specification for Threading, Gaging, and Thread Inspection of Casing, Tubing and Line Pipe Threads", API Specification STD 5B, 13th Edition, May 31, 1988 by American Petroleum Institute.
Mobile Oil Coompany Procedure for Makeup of API Connections with Torque-Turn Monitoring Equipment; Dec. 28, 1988.
Mobile Oil Company Procedure for Make-Up of API Connections with Torque-Turn Monitoring Equipment; Mar. 21, 1991.

Primary Examiner—Victor R. Kostak
Attorney, Agent, or Firm—Donald M. Satina

[57] ABSTRACT

The invention is a method and apparatus for continuously monitoring the application of a coupling to a pipe. The invention operates in several modes. In the position mode, the apparatus rotates the coupling to a desired final position. In the program mode, the apparatus determines the actual location of the hand-tight plane and continuously monitors the torque applied and the number of turns of rotation of the coupling from the hand-tight plane to the desired final position. In either of these modes, the torque applied is monitored and rotation of the coupling is discontinued if a preset maximum torque value is exceeded. If the coupling is rotated to the desired final position without reaching a minimum torque, the pipe and coupling are rejected. An image processing system is employed to locate several critical make-up parameters.

17 Claims, 3 Drawing Sheets

AUTOMATIC SCREW-ON PIPE COUPLINGS

BACKGROUND OF THE INVENTION

This invention relates to application of a coupling onto the end of a threaded pipe and, more particularly, to an improved method and apparatus for automatically locating critical coupling parameters and for real-time monitoring of the coupling application.

Pipe sections used in the oil industry for line pipe, well casing, etc. usually have tapered exteriorly threaded ends. These pipe are joined together using couplings in the form of collars which have interior tapered threads extending inwardly from each end. In order to form a leak tight joint between pipe sections, a thread compound is applied to the coupling threads, the coupling is threaded onto one end of a pipe, and a second pipe is threaded into the coupling. Since the pipes must be joined in the field, the pipes are usually ordered from manufacturers with a coupling attached to one end. Due to the high internal pressures which such pipe must withstand in service, each pipe and coupling is manufactured and inspected to rigorous standards and each coupling must be installed according to rigid industry and customer specifications.

There are two major factors which determine whether or not a coupling has been applied to a pipe in an acceptable manner. The first is the length of engagement of the threads of the coupling with those of the pipe. The second is the amount of torque required to screw-on the coupling to the specified final position. The thread dimensions, final coupling position and other coupling parameters are the subject of specifications issued by the American Petroleum Institute ("API") for the various pipe types and sizes.

Figure 2:
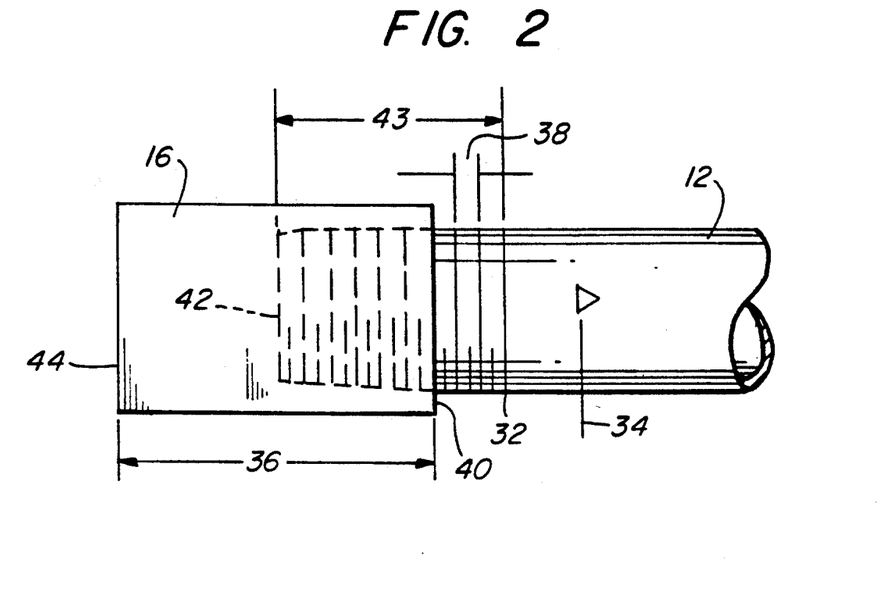

API's *Specification for Threading, Gaging, and Thread Inspection of Casing, Tubing and Line Pipe Threads*, API Specification STD 5B, 13th Edition, May 31, 1988, sets forth the required basic dimensions of pipe and coupling threads, as well as hand-tight and power-tight positions on page 7, FIG. 2.1. One such dimension, $L_4$ is the measurement of the total length of the threaded portion of each end of the pipe from the end of the pipe to the point that the threads vanish. This length varies according to the pipe diameter. Each coupling is required to have a particular length of threads from the applied bearing face for proper mating with the pipe threads. This coupling thread length also changes with pipe diameter and thread type.

As observable in FIG. 2.1 of API STD 5B, a ⅜ inch high equilateral triangle is die-stamped onto the pipe surface to indicate the desired final position of the applied face of the coupling after power tightening. The location of this triangle stamp depends on the thread type. For buttress thread, API requires the triangle to be at $L_4$ plus 0.300 inches for pipe sizes 13⅜ inches in diameter and smaller and at $L_4$ plus 0.200 inches for pipe sizes 16 inches in diameter and larger. For 16, 18⅝ and 20 inch diameter 8-round thread casing in Grades H40, J55 and K55, API requires the triangle to be at $L_4$ plus 1/16 inch (0.0625 inch). Although API does not require a triangle stamp for some pipe sizes and thread types, the preferred standard practice is to place a triangle stamp at $L_4$ plus 1/16 inch for all pipe except buttress, with buttress stamped at $L_4$ plus 0.200/0.300 inches as indicated above.

A coupling is usually installed to one end of each pipe in a two step process as follows. The coupling is threaded on to the "hand-tight" position, which corresponds to the position at which the threads of the pipe and the coupling are engaged to such an extent that any further threading would cause interference between the pipe and coupling threads. Since the final desired position, known as the "power-tight" position, of the coupling face is known and the thread pitch is known, the number of turns of the coupling required to reach the final position from the hand-tight position can be determined. While the pipe is held stationary, the coupling is rotated the number of turns so determined and the torque being applied is measured. If a specified maximum torque value is reached before the coupling reaches the desired final position, the pipe is rejected. Also, should the coupling be screwed on to the final position without reaching a minimum torque value, the pipe is rejected. Therefore, there is an allowable window of make-up torque for acceptability of each pipe and coupling.

In order to confirm that a pipe or coupling is joined in an acceptable manner, it is critical to determine the actual hand-tight position or reference point as the coupling is being screwed on. In some prior art coupling systems, a pre-determined value is assigned as the reference torque and the hand-tight position is presumed to be the position of the coupling when the level of applied torque reaches this level. Whenever an irregularity in the pipe or coupling threads or in the state of out-of-roundness of the pipe or the coupling causes a spike in the torque measurement which exceeds the reference torque value, this system provides an erroneous reading of the hand-tight position, resulting in a failure to accurately determine the final make-up conditions of the pipe joint.

In the present invention, a computer analysis of a combination of known pipe and coupling dimensions, position measurements obtained through image analysis, counting of turns of coupling rotation and torque measurements is used to determine the precise hand-tight position and to map the turns and torque values during rotation of the coupling from the hand-tight position to the final power-tight position. In this manner, a coupling can be automatically installed on pipe to the required specifications and the make-up parameter data stored for analysis.

SUMMARY OF THE INVENTION

A method of automatically attaching a coupling onto an end of a pipe to a desired final position a predetermined distance from the end of the pipe, the coupling and the pipe each having mateably engageable tapered threads of a predetermined pitch, the coupling being of a predetermined length and having a first end and a second end, the method including the steps of clamping a pipe in a stationary position; locating the position of one end of the pipe; storing data representing the located position of the one end of the pipe; supporting the coupling proximate the one end of the pipe; rotating the coupling while urging the first end of the coupling against the one end of the pipe to engage the threads of the coupling with the threads of the pipe; continuing to rotate the coupling until a predetermined maximum rotational torque is reached; locating the position of the second end of the coupling relative to the location of the one end of the pipe; calculating the distance between the location of the first end of the coupling and the desired final position using the located position of the one end of the pipe, the located position of the second end of the coupling, the predetermined length of the coupling, and the predetermined distance to the final position; calculating the number of turns of rotation of the coupling required to bring the first end of the coupling to the desired final position using the predetermined pitch of the threads of the coupling and of the pipe and the calculated distance from the first end of the coupling to the desired final position; and rotating the coupling by the calculated number of turns.

The invention also includes a method of electronically locating the hand-tight position of a first member relative to a second member to which said first member is being threadably interconnected, the members having mateably engageable tapered threads of a known pitch. The method includes the steps of measuring the torque applied to the first member as the first member is rotated relative to the second member; measuring the rotational position of the first member relative to the second member at predetermined intervals as the first member is rotated relative to the second member; predicting the expected rate of increase in the torque with rotation of the first member relative to the second member beginning at the hand-tight position; at each measured rotational position, calculating a torque value expected at the next rotational position to be measured from the measured torque value and the predicted expected rate of increase of the torque with rotation; comparing the torque value actually measured at the next rotational position to the calculated expected torque value for such rotational position; and when the calculated expected torque value and the actually measured torque value for any rotational position are within a predetermined amount, identifying the previous rotational position as the hand-tight position.

DESCRIPTION OF THE PREFERRED EMBODIMENT

Figure 1:
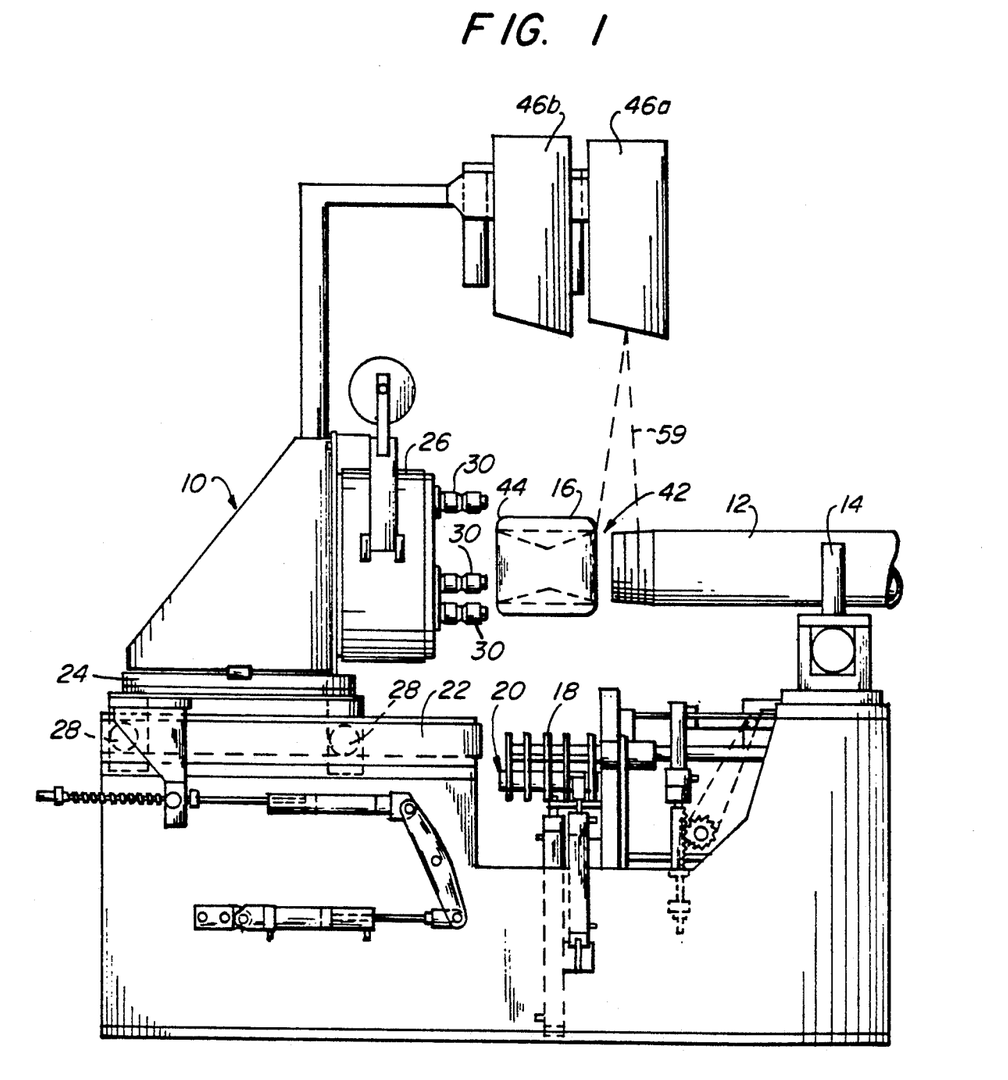

After a pipe has been threaded and inspected, it is delivered to a coupling station for screwing on of the coupling. Usually, one machine, a prescrew machine is used to apply the coupling to the hand-tight position and a second machine, a power tightener is used to rotate the coupling to the power-tight position. A suitable prescrew apparatus is described in U.S. Pat. No. 3,039,181, issued Jun. 19, 1962, the subject matter of which is incorporated herein by reference. FIG. 1 illustrates such a prescrew machine (10). A pipe (12) is brought into position and gripped by a stationary pipe holding chuck (14). A coupling (16) is fed to a suitable hoist mechanism (not shown) by a feed mechanism (18) from a greasing mechanism (20). After the greasing mechanism (20) applies a thread compound uniformly about the interior threads of the coupling (16), the hoist mechanism lifts it into a position axially aligned with pipe (12), as shown in FIG. 1, and supports it in this position. Prescrew machine (10) has a horizontal guideway (22) axially aligned with the pipe (12) and supported coupling (16). A carriage (24) for supporting a coupling chuck (26) is mounted on the guideway on suitable rollers (28). A plurality of roller jaws (30) are provided on the face of coupling chuck (26). While coupling chuck (26) is non-rotatable, each roller jaw (30) rotates individually about an axis parallel to the axis of the pipe. Each roller jaw is covered with a resilient friction material. The shafts of roller jaws (30) are mounted in slots which permit the jaws (30) to be retracted away from the central axis of coupling chuck (26) to accept a coupling (16) and to be advanced towards the central axis of coupling chuck (26) to grip a coupling (16).

With roller jaws (30) retracted, the support carriage (24) is moved axially toward pipe (12) bringing coupling chuck (26) into contact with coupling (16). Roller jaws (30) are advanced to grip coupling (16) around its exterior and the hoist mechanism is retracted. Roller jaws (30) are then rotatably driven, usually through a pneumatic or hydraulic motor, causing coupling (16) to rotate. Carriage (24) is advanced, causing the internal threads of coupling (16) to engage the external threads of pipe (12). Rotation of coupling continues, causing the coupling to be threaded onto the pipe. Since the threads of the coupling and of the pipe are tapered, as the coupling approaches the hand-tight position, the thread compound is compressed and the torque required to continue rotation of the coupling increases. Rotation of the coupling is stopped at a predetermined torque level when the roller jaws slip about the exterior of the coupling or the pneumatic or hydraulic motor stalls. These limits prevent the over-tightening or cross-threading of the coupling onto the pipe. Roller jaws (30) are then retracted and the carriage (24) is returned to its original position. At this point, the coupling should be attached to pipe to the hand-tight position. However, for a variety of reasons, the hand-tight position may not have been reached. The machine operator measures the distance between the previously applied triangle stamp on the pipe and the applied face of the coupling to determine the distance and the number of rotations required for the final make-up. If the measurement is within the expected range, the pipe and coupling are fed to a power tightener (not shown) for final make-up. However, if the number of turns required is very high or very low, a problem with the prescrew threading is indicated and the pipe and coupling are evaluated and corrective action is taken by the machine operator.

At the power tightener (not shown), the pipe is again gripped by chucks to prevent its rotation. Chucks on the rotating spindle of the power tightener grip the exterior of the coupling. A preferred power tightener has a 100 HP DC variable speed motor capable of delivering a mean speed of 20 surface feet per minute at 48,000 ft./lb. of torque maximum. A strain gauge is mounted on the worm gear which drives the rotating spindle of the power tightener for measuring the strain on the gear. The preferred strain gauge is a 300,000 lb. load cell. Through calculations based on known machine parameters, this strain measurement is converted to a reading of the torque being applied to the coupling by the machine. This torque may be recorded on a chart recorder. A coupling rotational position measurement system or turns counter counts turns of the rotating spindle of the power tightener and the coupling gripped thereby relative to the starting point and this information may be recorded in relation to the applied torque on a chart recorder. The resolution of the turns counter should be at least 1/20th of a turn. After the pipe and coupling are gripped by the power tightener, the operator of current power tighteners must manually dial into the machine the number of turns that he has measured as required to rotate the coupling to the desired final position. The machine is then turned on and rotates the coupling to the final power-tight position. During coupling rotation, the applied torque is usually monitored, and, should the torque exceed a maximum value, rotation is stopped. A drift pin in then pushed through to the pipe to make sure that there are no obstructions therewithin. The pipe and attached coupling are then sent for final inspection.

The automatic coupling screw-on machine according to the invention eliminates the variability inherent in this manual system. Through the use of a computerized control system, couplings can be automatically installed under continuous real-time monitoring and the make-up data (torque and position) can be displayed real-time and recorded for future reference.

The system according to the invention takes advantage of the fact that for each type of pipe of a particular diameter and thread-type, many of the basic dimensions are known. These known values are stored in a computer to be looked up rather than measured for each pipe. For example, according to API specification STD 5B (previously referenced), for seven-inch casing long-thread dimensions (Table 2.3 on page 9), $L_4$ is 4.000 inches. Since the triangle stamp is placed at $L_4$ plus 1/16 inch, the final desired position of the applied face (40) of the coupling is 4.0625 inches. The coupling is of a known overall length. Also for this pipe, the thread pitch or number of threads per inch is eight.

For quality control purposes, it is important to know the actual value of $L_1$, the length from the end of the pipe to the hand-tight plane. From this position, the API specifies the hand-tight stand-off (A), the number of turns required from the actual hand-tight position to reach final make-up position. For the pipe of this example, (A) equals 3. While $L_1$ is specified in Table 2.3 on page nine of API STD5B, higher assurance of the actual make-up values results from actual measurement of this value. Following make-up, i.e., rotation of the coupling to the power-tight position, the face of the coupling should be approximately at the base of the triangle stamp.

In the automatic control system according to the invention, the known values for the various pipe sizes, thread types and couplings are stored in look-up tables in a computer. Pulse counts from the rotating spindle of the power tightener are received by the computer as an indication of the number of turns of rotation of the coupling and the analog signal from the strain gauge is output to the computer for real-time tracking of the torque being applied to screw-on the coupling. As observable from FIG. 2, once the location of the relative positions of the triangle stamp (34) and the applied face (40) of the coupling are supplied to the computer, the distance between triangle stamp (34) and applied face (40) can be determined, the number of rotations of coupling (16) required to bring applied face (40) to triangle stamp (34) can be calculated using the known thread pitch, and the coupling can be automatically applied to a desired final position. However, the triangle is stamped on the end of the pipe at only one location and locating the triangle stamp (34) automatically at the coupling machine usually requires rotation of the pipe. Also, the stamp is not always readily observable by current video imaging systems. Finally, the location of applied face (40) of coupling (16) can be obscured by thread compound following prescrew.

A novel method of locating these critical makeup parameters according to the invention employs actual real-time measurements supplemented by known standard values stored in the computer. Once the pipe has been delivered to the prescrew station, the end (42) of the pipe will remain stationary until after the coupling has been applied hand-tight. Pipe end (42) is located mechanically or visually and the position is provided to the computer.

FIG. 2 illustrates the critical dimensions and reference points for continuous monitoring of the power tightening phase of coupling application. The thread vanishing point (32) is the end of the threads and determines the position of the base of the triangle stamp (34) which may, depending on the thread type and pipe size, be from 0.0625 to 0.300 inches from vanishing point (32). The coupling length (36) is a known constant value for each pipe type. Also, the thread pitch, the number of threads per inch, is known. Accurate final make-up to the desired final position from the coupling prescrew (hand-tight) position can be accomplished once the location of the applied face (40) of the coupling relative to the base of the triangle stamp (34) is determined. The computer can then use a look-up table to obtain $L_4$ (43), the length from the end (42) of the pipe to the vanishing point (32). Since end (42) has been located, and $L_4$ is known, vanishing point (32) is also known. Also, the distance from the vanishing point (32) to the base of the triangle (34) can be looked up by the computer for the pipe type, permitting the computer to calculate the desired final power-tight position of coupling face (40) relative to the hand-tight position of coupling face (40).

Coupling (16) is then screwed on to the pipe approximately to the hand-tight position. Open coupling face (44) does not have an accumulation of thread compound and can be located mechanically or visually. Once located, the position of open face (44) relative to pipe end (42) is provided to the computer. Since the computer's memory contains the overall length (36) of the coupling (16), the computer now has all information necessary to identify the position of the applied face (40) of coupling (16) relative to the vanishing point (32) and triangle (34) and to calculate the distance from applied face (40) to triangle (34). Using the calculated distance between applied face (40) and triangle (34) and the know thread pitch (38), the computer calculates the number of turns of rotation of the coupling required for face (40) to reach triangle (34). This information is then available for automatic or manual programming of the power tightener to rotate the coupling precisely to the desired final position.

Figure 3:
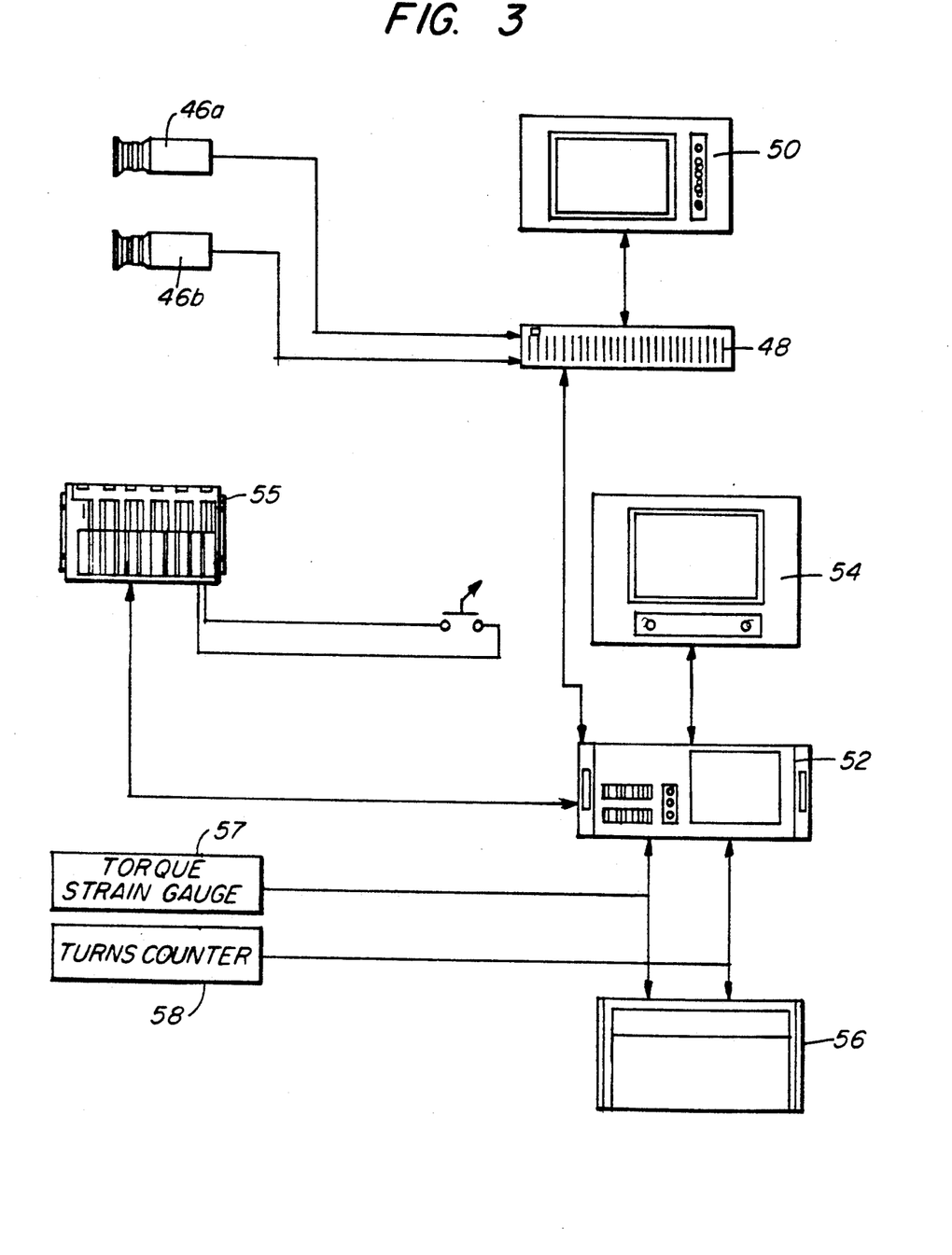

FIGS. 1 and 3 illustrate the preferred embodiment of the apparatus for locating pipe end (42) and coupling end (44). While mechanical position determination is possible, the preferred equipment employs image analysis and comprises a combination of one or more video cameras (46), a video image processor (48), a video monitor (50), a computer (52), a video display (54) for computer (52), a programmable logic controller or PLC (55) and a chart recorder (56). PLC (55) controls the operation of the various equipment at the pipe coupling station, including the power tightener, camera (46), computer (52), video display (54) and image processor (48).

Referring to Figure 1 a first camera (46) is mounted proximate coupling prescrew machine (10) with a field of view (59) which includes the pipe end (42). The image processor (48) digitizes the image from camera (46a) and uses a pixel by pixel comparison to locate pipe end (42) as the point of an abrupt change in contrast in the processed image. Image processor (48) outputs the location of pipe end (42) to the computer (52). Coupling (16) is then screwed on to pipe (12) approximately to the hand-tight position by prescrew machine (10), as previously described.

Image processing is again used to locate open face (44) of coupling (16) after prescrew. While camera (46a) could be scanned to perform this function, the preferred embodiment employs a second camera (46b) for identification of the open coupling face. In this manner, first camera (46a) is available to view pipe (12) during prescrew to observe that no movement of pipe (12) occurs. Also, since the cameras are stationary with a fixed field of view, the lens focus of each camera is also fixed to eliminate any focus-related variability in the measurements. The image from camera (46b) is digitized, analyzed by image processor (48), and the location of open coupling face (44) is determined by the change in contrast and data representing the location is output to computer (52). Since the positions of cameras (46a) and (46b) are calibrated, the value provided to the computer represents the location of open face (44) relative to pipe end (42), located from the image provided by first camera (46a).

Referring to FIG. 2, the computer (52) now has in memory data representing the location of pipe end (42) and has calculated the vanishing point (32) and the location of the triangle stamp (34). With the addition to memory of data representing the location of open face (44) of coupling (16), the computer uses the known coupling length (36) to determine the relative position of applied face (40) and compares the applied face position (40) to the location of the triangle stamp (34) to determine the length of final make-up required. Using the known thread pitch, the computer calculates the precise number of turns of coupling rotation required to move coupling (16) by the calculated length to bring the applied face (40) of coupling (16) to its final desired position at the base of triangle (34). This information is relayed to the operator and to the programmable logic controller, which controls the power tightener machine, for use in final make-up. With this information, it is possible to automatically control installation of a coupling to a desired final position.

In addition to automatic control of coupling installation to a desired final position, it is desirable to monitor the applied torque and number of turns during power tightening for quality assurance of a good joint and to meet various customer specifications. The critical feature for computer control of power tightening of couplings within specified applied torque criteria is the ability to identify the actual hand-tight plane. Some prior art systems assign a torque value as a reference and assume that the hand-tight position is reached once this reference torque is attained. However, slight irregularities in threads or out-of-roundness of the pipe or coupling can lead to spikes in the torque which exceed the reference value, causing the system to erroneously identify a position as the hand-tight plane.

Computer identification of the hand-tight plane is possible because once the hand-tight position is reached, the threads of the coupling and the threads of the pipe are fully engaged. Since the threads of the pipe and of the coupling are tapered, any further rotation of the coupling from the actual hand-tight plane will cause interference of the threads, resulting in the torque increasing in a linear manner in relation to the number of turns of rotation. Based on the make-up of other pipes, an expected slope of the curve of the turns versus applied torque plot from the reference point of the hand-tight position is developed. After the coupling is prescrewed to the pipe, the pipe and coupling are transfered to the power tightener. As the coupling is rotated with the pipe held stationary, the torque strain gauge (57) provides a value to the computer representative of the torque being applied to the coupling and the turns counter (58) provides pulses representative of rotation of the coupling in degrees or in fractions of one rotation. Using the last measured torque value and the expected increase in the torque from the last position to the current position from the expected slope of the turns versus applied torque curve, the computer generates a predicted torque value for each subsequent rotational position. The computer compares the actually measured reading of the applied torque to the predicted value for each subsequent rotational position provided by turns counter (58). When the actually measured torque value is first equal to or within a predetermined amount from the predicted torque value, the increase in the torque per turn has become linear and the hand-tight plane has been statistically determined. Since the computer is fitting two points to the curve, the first point is the acutal hand-tight plane. This first point is the rotational position measured immediately before the rotational position at which the measured torque value equals the predicted value. Therefore, the computer assigns the hand-tight position to this prior measured rotational position. The computer memory contains the hand-tight stand-off (A), the maximum and minimum final number of turns to final desired make-up position, and the maximum and minimum torques specified by the customers (if any) for final make-up. Once the actual hand-tight position has been identified, the computer is able to generate a window (60) of acceptability of the make-up as more clearly indicated in the chart of FIG. 4.

Figure 4:
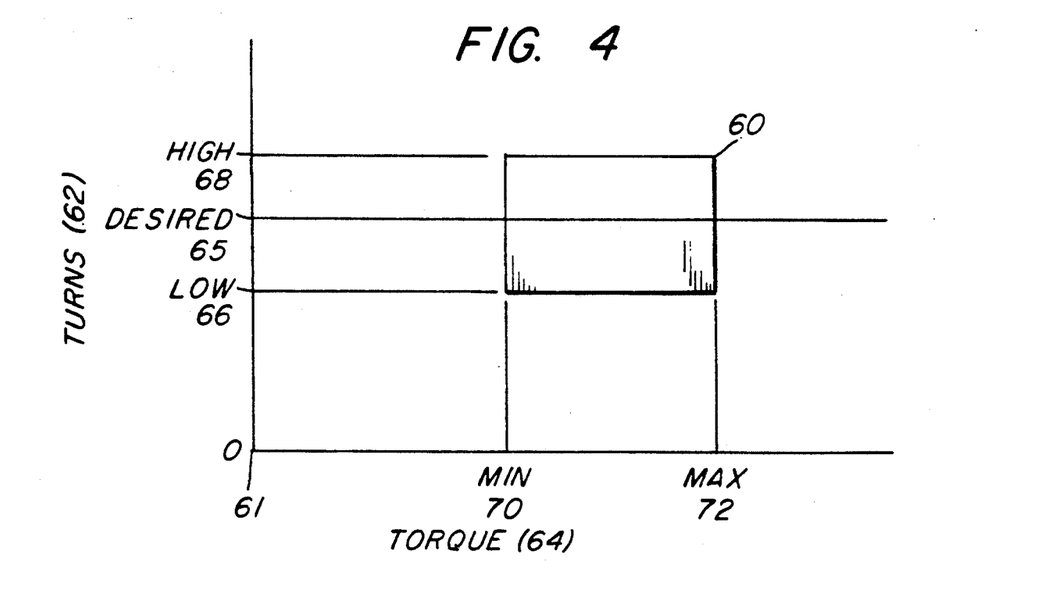

In FIG. 4, reference point (61) represents the actual hand-tight position as determined statistically as described above. The number of turns from this position are indicated on scale (62) and the applied torque beginning at the reference torque value is illustrated on scale (64). The desired final make-up position of applied face (40), corresponding to the base of triangle stamp (34), relative to the applied face (40) of coupling (16) at the actual hand-tight plane is calculated by the computer from the initial location of the pipe-end (42), the prescrew location of the open face (44) of coupling, the length (36) of the coupling, and the number of turns applied to the coupling by the power tightener until the actual hand-tight position was reached. The predicted final position is illustrated as line (65). Since there is some deviation permitted from this final position, the minimum number of turns to the final make-up position is illustrated as line 66 and the maximum number as line (68). Customer specifications may also require that the coupling be applied to a final make-up torque within a range illustrated on FIG. 4 as the minimum torque (70) and the maximum torque (72). Therefore, according to the invention, all couplings can be monitored to determine that the installation to the final position resulted in a combination of applied torque and number of turns within this turn-torque window (60) of acceptability. As indicated on FIG. 3, the values of the torque and coupling turns are supplied to the computer (52) and to chart recorder (56) from torque strain gauge (57) and turns counter (58) and a graph of these make-up parameters can be produced.

The system is adapted to operate in several modes. In the position mode, the system determines the position of the applied face (40) of the coupling at the hand-tight plane, refers to a reference table or a manually input value for the desired final position and provides the necessary information to PLC (55), which controls the power tightener to rotate the coupler to the desired final position. Torque values are monitored and recorded but do not control the process.

In the torque mode, the computer refers to a reference table or a manually input value for the minimum and maximum torque values and monitors the applied torque readings supplied by the torque strain gauge (56) while supplying information to PLC (55) to control the power tightener to rotate the coupling within this torque window. The final make-up position is monitored and recorded and, should deviations from the API position specifications for thread-type being processed result, alarms are activated.

The preferred mode of operation is called the program mode. The system is operated for a trial run, and while making up a predetermined number of joints to a fixed position, a table of minimum and maximum torque values is developed for the particular order. After the trial run, the system is then operated to statistically determine the hand-tight plane through identifying the point where the torque becomes linear with turns as described above. The computer and PLC then control the power tightener to rotate the coupling the required number of turns to the desired final make-up position while monitoring the torque and turns sensors to automatically control make-up to within the of window of acceptability.

In a fourth mode of operation, the experimental mode, values for both torque and final position can be input manually or retrieved from experimental data or reference tables in order to control power make-up within torque and position windows. This mode can be used for conducting trials for determining the effects of various coupling grease compounds, coupling plating materials, and other experimental make-up parameters.

The automated coupling screw-on system according to invention uses a unique vision system preferably consisting of two video cameras (46a and 46b) and an image processor (48) which relays information to the computer (52). The first camera (46a) will be oriented to view the end of the pipe (42) in its position before the coupling is attached and is used to determine the precise position of the pipe end (42) prior to coupling pre-screw. This camera (46a) is in a fixed position with a fixed focus and sends a snap-shot of the pipe in place to the image processor (48). The image processor digitizes the camera picture and analyzes the digitized picture by a pixel to pixel comparison. When a change in contrast indicative of the end of the pipe is encountered, the image processor outputs this position to the computer as the location of pipe end (42).

The coupling is then pre-screwed onto the pipe to approximately the hand-tight position. A second camera (46b) is used to determine the position of the coupling after pre-screw. This camera (46b) is set up to view the open end (44) of the coupling (16) which has been applied hand-tight instead of applied face (40) because thread compound built-up on the applied face (40) of the coupling (16) could result in an erroneous identification of the applied face. The picture of the coupling as prescrewed onto the pipe is sent to the image processor (48) which digitizes it and locates the open face (44) of the coupling by a pixel to pixel comparison and identifies open face (44) as the point where a change in contrast in the digitized picture is encountered. This value is then output to the computer (52).

FIG. 2 illustrates the positions of the pipe and coupling at this point and the critical dimensions. The system is set up by the operator for a particular pipe and coupling when the first pipe of a batch arrives at the prescrew machine. The operator is prompted by the computer through video display (54) and enters into the computer the pipe size, wall thickness, and grade, then the thread type and coupling plating type. Information known from reference tables based upon this entered information would be the vanishing point (32) of the threads, the location of the base of the triangle (34), the coupling length (36) and coupling color information, including relative contrast and threshold values, which is important for the image processor for contrast comparison. Once the end (42) of the pipe (12) and the open-end (44) of coupling (16) ar identified by the image processor (48), the location of the applied face (40) of the coupling relative to the triangle (34) can be determined by the computer. The computer then calculates the distance between the applied face (40) and the triangle base (34) and, since the thread pitch is in memory, the computer calculates, relays to PLC (55) and displays to the operator, the number of turns required to bring the applied face (40) of the coupling to the desired position at the base of triangle stamp (34). The power tightener is then activated by PLC (55) and rotates the coupling the calculated number of turns to the desired final position.

Based on the entered and measured values, the computer program establishes when linearity of the applied torque per turn curve has occurred. The computer assigns this value as the reference point (61) and generates the window (60) of acceptability of FIG. 4. The power tightener will continue to screw on the coupling to a position of pre-set points, at which time the power tightener will shift into the creep mode and rotate the coupling at a much slower speed to the final make-up position to prevent over-turning. The computer will monitor the number of turns from the reference point to the final position of the coupling and accumulate this information along with the final applied torque value. This information will be used to construct torque windows for future runs of this type of pipe and will be stored and available for quality evaluation.

Various video cameras, image processors and computers would be useful with this system. In the preferred embodiment, the cameras are Hitachi Model KP-111 black and white solid state units having a high-density design with 570 horizontal and 485 vertical picture elements. The image camera provides a resolution to the image processor of 85 pixels per inch over the viewing field of 6 inches. This equates to a measurement accuracy of plus or minus 0.012 inches. The preferred image processor (48) is a Data Cube AT-1. As previously described, this imaging system uses pixel control to process algorithms on a pixel to pixel basis and the variations in contrast are used to ascertain the pipe end (42) and open face (44) of the coupling (16). This image processor has the capacity to store three 512×512×8-bit images simultaneously and has a dual-port memory which allows direct sharing of pixel information with the computer (52). The preferred computer is IBM compatible and Intel-based. The microprocessor should be at least a 25 MHz 80386 to achieve the required processing speed. The preferred computer is equipped with a 25 MHz 80387 math processor, 4 MB of RAM and a 156 MB hard disk. The computer may or may not be connected to a mainframe for long-term data storage. The computer will preferably have a floppy disk drive for record-keeping and will be connected to a high-speed chart recorder to plot curves when desired for recording torque and turns. The preferred chart recorder employs eight pens and can provide chart speeds of 1.0 mm to 200 mm per second. The preferred system employs a video monitor, preferably a high-speed 16 bit VGA high-resolution multisync monitor. Also, the operator's display screen (54) is preferably a color monitor. A standard IBM keyboard is preferred.

Comparable equipment can be substituted for the above. As the state of the computer art advances, it is expected that the preferred equipment mix will evolve.

The foregoing detailed description is understood to be given by way of illustration and example only and the spirit and scope of this invention are to be limited solely by the appended claims.

I claim:

1. A method of automatically attaching a coupling onto an end of a pipe to a desired final position a predetermined distance from the end of the pipe, the coupling and the pipe each having mateably engageable tapered threads of a predetermined pitch, the coupling being of a predetermined length and having a first end and a second end, which method comprises:

clamping a pipe in a stationary position;

locating the position of one end of the pipe;

storing data representing the located position of the one end of the pipe;

supporting the coupling proximate the one end of the pipe;

rotating the coupling while urging the first end of the coupling against the one end of the pipe to engage the threads of the coupling with the threads of the pipe;

continuing to rotate the coupling until a predetermined maximum rotational torque is reached;

locating the position of the second end of the coupling relative to the location of the one end of the pipe;

calculating the distance between the location of the first end of the coupling and the desired final position using data representing the located position of the one end of the pipe, the located position of the second end of the coupling, the predetermined length of the coupling, and the predetermined distance to the final position;

calculating the number of turns of rotation of the coupling required to bring the first end of the coupling to the desired final position using the predetermined pitch of the threads of the coupling and of the pipe and the calculated distance from the first end of the coupling to the desired final position; and rotating the coupling by the calculated number of turns.

2. The method of claim 1, further comprising measuring the rotational position of the coupling during said rotation by the calculated number of turns.

3. The method of claim wherein said locating of the position of the one end of the pipe comprises producing an image of the one end of the pipe with a video camera and analyzing the image with a video processor.

4. The method of claim 3, wherein said locating of the position of the second end of the coupling comprises producing an image of the second end of the coupling with a video camera and analyzing the image with a video processor.

5. The method of claim 1, wherein said storing of data representing the located position, said calculating of the distance and said calculating of the number of turns are performed by a computer.

6. The method of claim 2, further comprising measuring the torque applied to the coupling during rotation of the coupling by the calculated number of turns.

7. The method of claim 6, further comprising comparing the measured torque to a maximum torque value and, if the measured torque value exceeds the maximum torque value, discontinuing rotation of the coupling.

8. The method of claim 6, further comprising comparing the measured torque to a minimum torque value and, if the measured torque value does not reach the minimum torque value before the coupling is rotated by the calculated number of turns, rejecting the pipe and coupling.

9. The method of claim 6, further comprising comparing a torque value actually measured at each measured rotational position to a predicted torque value for such rotational position and, when a torque value actually measured at the present position is first equal to or within a predetermined amount of the predicted torque value, storing data representing the rotational position last measured before the present position.

10. The method of claim 9, further comprising measuring the number of turns of rotation of the coupling from the rotational position represented by the stored data to the desired final position during rotation of the coupling by the calculated number of turns and, if the measured number of turns is less than a minimum number of turns, rejecting the pipe and coupling.

11. An apparatus for threadably attaching a first end of a first tubular member to a first end of a second tubular member to a desired final position a predetermined distance from the first end of the second tubular member, said first and second tubular members having interfitting, mateably engagable threads of a predetermined thread pitch, said apparatus comprising:

electronic means for receiving information, storing information and making calculations;

means for locating the position of the first end of the second member and for providing data representing the located position to said electronic means;

means for threadably attaching the first end of the first member to the first end of the second member to a first position between the first end of the second member and the desired final position;

means for locating the position of the second end of the first member at the first position relative to the location of the first end of the second member and for providing data representing the located position to said electronic means; and means for rotating the first member with respect to the second member;

said electronic means being adapted to calculate the location of the first end of the first member at the first position relative to the first end of the second member from data representing the provided located position of the second end of the first member, the provided located position of the first end of the second member and the predetermined length of said first member;

said electronic means being further adapted to calculate the distance between the first end of the first member in the first position and the desired final position and to calculate the number of rotations of the first member required for the first end of the first member to move the calculated distance to the desired final position.

12. The apparatus of claim 11, wherein said means for locating the position of the first end of the second member comprises a video imaging means for producing an image of the first end of the second member and a video processing means for analyzing the image.

13. The apparatus of claim 12, wherein said means for locating the position of the second end of the first member comprises a video imaging means for producing an image of the first end of the second member and a video processing means for analyzing the image.

14. The apparatus of claim 11, wherein the second member is a pipe.

15. The apparatus of claim 14, wherein the first member is a coupling.

16. The apparatus of claim 11, wherein said electronic means is a computer.

17. A method for attaching a first member threadably interconnected to a second member to a desired final position which is a predetermined number of rotations from a hand-tight position, the first member and the second member each having mateably engageable tapered threads of a known pitch, said method comprising:

clamping the second member in a stationary position;
   supporting the first member proximate one end of the second member;
   rotating the first member while urging an end of the first member against the proximate end of the second member to engage the threads of the first member with the threads of the second member;
   measuring the torque applied to the first member as the first member is rotated relative to the second member;
   measuring the rotational position of the first member relative to the second member at pre-determined intervals as the first member is rotated relative to the second member;
   predicting the expected rate of increase in the torque beginning at the hand-tight position from torque values measured during rotation of a plurality of previously attached first and second members;
   electronically calculating a torque value expected at the next rotational position said torque value calculated from the measured torque value and the expected rate of torque increase;
   electronically comparing the torque value actually measured at the next rotational position to the calculated torque value for such rotational position;
   when the calculated torque value and the actually measured torque value for any rotational position are within a pre-determined range, identifying the previous rotational position as the hand-tight position; and
   rotating the first member relative to the second member a predetermined number of turns past said hand-tight position such that the first member is at said final position relative to the second member.

* * * * *